United States Patent [19]

Ciric

[11] 3,923,639

[45] Dec. 2, 1975

[54] CONVERTING HYDROCARBONS WITH ZEOLITE ZSM-4

[75] Inventor: Julius Ciric, Pitman, N.J.

[73] Assignee: Mobil Oil Corporation, New York, N.Y.

[22] Filed: May 17, 1972

[21] Appl. No.: 254,128

Related U.S. Application Data

[60] Division of Ser. No. 722,149, April 18, 1968, which is a continuation-in-part of Ser. No. 509,568, Nov. 24, 1965, abandoned.

[52] U.S. Cl.............. 208/111; 208/120; 252/455 Z
[51] Int. Cl.² B01J 29/28; C01G 11/04; C01G 13/04
[58] Field of Search.............................. 208/111, 120

[56] References Cited
UNITED STATES PATENTS

| | | | |
|---|---|---|---|
| 3,190,939 | 6/1965 | Benesi | 260/683.65 |
| 3,280,212 | 10/1966 | Miale et al. | 260/683.65 |
| 3,301,917 | 1/1967 | Wise | 260/683.65 |
| 3,306,922 | 2/1967 | Barrer et al. | 260/448 |
| 3,314,752 | 4/1967 | Kerr | 423/329 |
| 3,370,099 | 2/1968 | Plank et al. | 260/666 |
| 3,375,205 | 3/1968 | Wadlinger et al. | 252/455 Z |
| 3,414,602 | 12/1968 | Acara | 260/448 |
| 3,431,219 | 3/1969 | Argauer | 252/455 Z |
| 3,578,723 | 5/1971 | Bowes | 260/672 |
| 3,716,596 | 2/1973 | Bowes | 260/671 |

*Primary Examiner*—Delbert E. Gantz
*Assistant Examiner*—G. E. Schmitkons
*Attorney, Agent, or Firm*—Charles A. Huggett; Raymond W. Barclay; Claude E. Setliff

[57] ABSTRACT

This invention deals with a process of converting a hydrocarbon charge by passing it over a new family of crystalline zeolites characterized by a distinctive X-ray powder diffraction pattern. The new family of crystalline zeolites is known as zeolite ZSM-4.

9 Claims, No Drawings

CONVERTING HYDROCARBONS WITH ZEOLITE ZSM-4

CROSS REFERENCE TO RELATED APPLICATION

This application is a division of copending application Ser. No. 722,149, filed Apr. 18, 1968, which in turn is a continuation-in-part of application Ser. No. 509,568, filed Nov. 24, 1965 and now abandoned.

BACKGROUND OF THE INVENTION

1. Field of the Invention

This invention relates to novel crystalline aluminosilicates and to methods for their preparation. More particularly, this invention relates to novel crystalline aluminosilicates having catalytic properties and to methods for utilizing such catalysts in organic conversion reactions.

2. Description of the Prior Art

Zeolitic materials, both natural and synthetic, have been demonstrated in the past to have catalytic capabilities for various types of hydrocarbon conversion reactions, especially catalytic cracking. Certain of these zeolitic materials comprise ordered, porous crystalline aluminosilicates having a definite crystalline structure, as determined by X-ray diffraction, within which there are a large number of small cavities which are interconnected by a series of still smaller channels or pores. These cavities and pores are precisely uniform in size within a specific zeolitic material. Since the dimensions of these pores are such as to accept for adsorption molecules of certain dimensions while rejecting those of larger dimensions, these materials have come to be known as "molecular sieves," and are utilized in a variety of ways to take advantage of the adsorptive properties of these compositions.

These molecular sieves include a wide variety of positive ion-containing crystalline aluminosilicates, both natural and synthetic. Among the synthetic zeolites are those known as A, Y, L, D, R, S, T, Z, E, F, Q, B, X. All can generally be described as having a rigid 3-dimensional network of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is negatively charged and the composition is balanced by the inclusion in the crystal structure of a cation, for example, an alkali metal or an alkaline earth metal cation. Thus a univalent positive sodium cation balances one negatively charged aluminosilicate tetrahedra. Where an alkaline earth metal cation is employed in the crystal structure of an aluminosilicate, it balances two negatively charged aluminosilicate tetrahedra because of its doubly positive valence. Other compositions in the aluminosilicate family contain both double positive cations, e.g. calcium and univalent positive cations, e.g. sodium, and are prepared, for example, by base exchanging a sodium aluminosilicate with a calcium compound solution such that not all of the sodium ions are removed. By means of such cation exchange, it has been possible to vary the size of the pores in the given aluminosilicate by suitable selection of the particular cation. The spaces between the tetrahedra are occupied by molecules of water prior to dehydration.

As indicated above, prior art techniques have resulted in the formation of a wide variety of synthetic crystalline aluminosilicates having catalytic properties. They are ordinarily prepared initially in the sodium or potassium form of the crystal, the process of preparation involving heating, in aqueous solution, an appropriate mixture of oxides, or of materials whose chemical composition can be completely represented as a mixture of oxides: $Na_2O$, $Al_2O_3$, $SiO_2$ and $H_2O$, at an elevated temperature, for example, approximately 100°C. for a period ranging from 15 minutes to 90 hours or more. The product which crystallizes from the aqueous solution of these oxides is separated from the supernatant liquid and water washed free of soluble matter. The aluminosilicate is thereafter generally activated by heating until water is removed by dehydration and the composition has the desired cavity and pore structure.

Many of the aluminosilicates have catalytic properties for cracking hydrocarbon feeds to materials useful in fuels and the like, e.g. cracking gas oil to light and heavy naphtha and lighter weight materials useful in LPG or as hydrocarbons in alkylation. The conversion level of these materials runs from 40 percent up to and including about 95 percent depending upon the zeolitic material.

SUMMARY OF THE INVENTION

The present invention relates to a novel family of synthetic crystalline aluminosilicates, hereinafter designated as "Zeolite ZSM-4" or simply "ZSM-4," to method for their preparation and to hydrocarbon conversion processes using them. The family of ZSM-4 compositions has the characteristic X-ray diffraction pattern set forth in Table 1, hereinbelow. ZSM-4 compositions can also be identified, in terms of mole ratios of oxides as follows:

$$0.9 \pm 0.2\ M_{2/n}O:W_2O_3:3-20\ YO_2:zH_2O$$

wherein M is a cation, $n$ is the valence of said cation, W is selected from the group consisting of aluminum and gallium, Y is selected from the group consisting of silicon and germanium, and $z$ is from 0 to 20. In the as synthesized form the zeolite has a formula, in terms of mole ratios of oxides as follows:

$$0.9 \pm 0.2\ M_{2/n}O:Al_2O_3:3-20\ SiO_2:zH_2O$$

and M is selected from the group consisting of a mixture of tetramethylammonium cations and alkali metal cations, especially sodium. The original cations can be at present so that the amount of tetramethylammonium cations is between 1 and 50 percent of the total amount of the original cations. Thus, the zeolite can be expressed by the following formula, in terms of mole ratios of oxides:

$$0.9 \pm 0.2\ [xR_2O + (1-x)M_{2/n}O]:W_2O_3:3-20\ YO_2:0-20\ H_2O$$

where W and Y have the previously assigned significance, R is tetramethylammonium, M is an alkali metal cation and $x$ is between 0.01 and 0.50.

The original cations can be replaced, at least in part, by ion exchange with another cation. Preferably, the other cation is selected from the group consisting of alkylammonium, e.g. tetramethylammonium, arylammonium, metals, ammonium, hydrogen, thermally treated products of ammonium and/or hydrogen, or combinations of any of these cations. Particularly, preferred cations of the zeolite are those wherein, in that cationic form the zeolite has good catalytic activity especially for hydrocarbon conversion. These include hydrogen, rare earth metals, aluminum, metals of groups II and VIII of the Periodic Table and manganese. Also desired are zeolites which are thermally treated products of the ammonium, hydrogen, arylammonium and/or alkylammonium cationic forms, said thermal treatment consisting of heating the zeolite in the particular cation form at a temperature of at least about 700°F. In a preferred embodiment of ZSM-4, W is aluminum, Y is silicon and the silica/alumina mole ratio is at least 5 and ranges up to about 15.

Catalytically active members of the family of zeolites designated herein as ZSM-4 have a property which distinguishes them from all known zeolites. Selectivity is measured as the ratio of o-xylene isomerized to that disproportionated. The selectivity factor as used herein, designates the weight ratio of o-xylene isomerized to o-xylene disproportionated employing 200 ml of o-xylene which has been percolated with activated alumina at 2 volumes per volume per hour at room temperature and introduced into a 1 liter steel shaker bomb containing 3.0 grams of zeolite which has been calcined, weighed out and after being weighed, dried at 900°F. for ½ hour, said bomb having been purged with nitrogen. The bomb is heated to 400°F. rapidly using an induction furnace while shaking at 200 RPM using an electric driven single cylinder Lawson engine for shaking the bomb. After 20 percent of the o-xylene is converted to conversion products, the bomb is water quenched, the shaking discontinued and the liquid sample analyzed. A complete description of apparatus to be used in determining the selectivity factor is disclosed in an article entitled "A New Laboratory Tool for Studying Thermal Processes" by J. W. Payne, C. W. Streed and E. R. Kent appearing in *Industrial and Engineering Chemistry*, Volume 50, pages 47–52 (1958). Such "selectivity factor" distinguishes ZSM-4 from other zeolites, notably crystalline aluminosilicates, since the highest selectivity factor of previously known crystalline aluminosilicates has been approximately 3.7, generally much lower. Members of the ZSM-4 family on the other hand are uniquely characteristic by selectivity factors in excess of 4 and generally at least 6.

Members of the family of ZSM-4 zeolites possess a definite distinguishing crystalline structure whose X-ray diffraction pattern has the following values:

Table 1

| Interplanar Spacing d(A) | Relative Intensity |
|---|---|
| 9.1 ± .2 | vs |
| 7.94 ± .1 | mw |
| 6.90 ± .1 | m |
| 5.97 ± .07 | s |
| 5.50 ± .05 | mw |
| 5.27 ± .05 | mw |
| 4.71 ± .05 | mw |
| 4.39 ± .05 | w |
| 3.96 ± .05 | w |
| 3.80 ± .05 | s |
| 3.71 ± .05 | m |
| 3.63 ± .05 | m |
| 3.52 ± .05 | s |
| 3.44 ± .05 | m |
| 3.16 ± .05 | s |
| 3.09 ± .05 | m |
| 3.04 ± .05 | m |
| 2.98 ± .05 | m |
| 2.92 ± .05 | s |

These values were determined by standard techniques. The radiation was the K-alpha doublet of copper, and a Geiger counter spectrometer with a strip chart pen recorder was used. The peak heights, I, and the positions as a function of two times theta, where theta is the Bragg angle, were read from the spectrometer chart. From these, the relative intensities, 100 $I/I_o$, where $I_o$ is the intensity of the strongest line or peak, and $d$ (obs.), the interplanar spacing in A., corresponding to the recorded lines, were calculated. In Table 1 the relative intensities are given in terms of the symbols $s$ = strong, $m$ = medium, $ms$ = medium strong, $mw$ = medium weak and $vs$ = very strong. It should be understood that this X-ray diffraction pattern is characteristic of all the species of ZSM-4 compositions. Ion exchange of the sodium ion with another cation reveals substantially the same pattern with some minor shifts in interplanar spacing and variation in relative intensity. various cation exchanged forms of ZSM-4 have been prepared. X-ray powder diffraction patterns of several of these forms are set forth below. The ZSM-4 forms set forth below are all aluminosilicates.

| NaTMAZSM-4 d(A°) | I/I$_o$ | NaTMAZSM-4 d(A°) | I/I$_o$ | HZSM-4 d(A°) | I/I$_o$ | ZnNaTMAZSM-4 d(A°) | I/I$_o$ |
|---|---|---|---|---|---|---|---|
| 17.5 | 2 | 17.6 | 5 | | | | |
| 16.0 | 17 | 16.1 | 20 | 15.8 | 12 | 16.1 | 6 |
| 9.18 | 100 | 9.19 | 100 | 9.12 | 100 | 9.21 | 79 |
| 7.96 | 21 | 7.96 | 20 | 7.88 | 49 | 7.97 | 40 |
| | | 7.34 | 3 | | | | |
| 6.94 | 12 | 6.93 | 30 | 6.85 | 24 | 6.92 | 36 |
| 6.01 | 34 | 6.01 | 33 | 5.95 | 62 | 6.01 | 60 |
| 5.53 | 4 | 5.53 | 7 | 5.47 | 10 | 5.53 | 6 |
| 5.29 | 8 | 5.29 | 7 | 5.25 | 10 | 5.29 | 15 |
| 4.73 | 30 | 4.72 | 31 | 4.69 | 19 | 4.73 | 51 |
| | | | | 4.54 | 7 | | |
| 4.41 | 4 | 4.39 | 4 | 4.37 | 23 | 4.40 | 9 |
| 4.12 | 5 | 4.19 | 1 | | | | |
| 3.97 | 13 | 3.95 | 11 | 3.94 | 20 | 3.97 | 18 |
| 3.82 | 67 | 3.81 | 69 | 3.78 | 52 | 3.82 | 100 |
| 3.74 | 11 | 3.72 | 28 | 3.69 | 14 | 3.72 | 36 |
| 3.64 | 31 | 3.63 | 26 | 3.61 | 13 | 3.64 | 24 |
| 3.54 | 30 | 3.53 | 54 | 3.50 | 28 | 3.53 | 72 |
| 3.46 | 7 | 3.45 | 14 | 3.42 | 12 | 3.45 | 15 |
| 3.28 | 4 | 3.28 | 5 | | | | |
| 3.17 | 73 | 3.16 | 48 | 3.15 | 43 | 3.17 | 60 |
| 3.10 | 12 | 3.10 | 23 | 3.07 | 14 | 3.10 | 27 |
| 3.05 | 25 | 3.04 | 21 | 3.03 | 20 | 3.05 | 27 |
| 2.99 | 14 | 2.99 | 13 | 2.97 | 10 | 3.00 | 18 |
| 2.93 | 43 | 2.92 | 48 | 2.91 | 29 | | |
| 2.83 | 4 | 2.83 | | 2.81 | 1 | | |
| 2.775 | 1 | | | 2.77 | 1 | | |
| 2.67 | 3 | 2.67 | 2 | | | 2.66 | 9 | lower boiling hydrocarbons, the reaction which takes place is essentially a cracking to produce hydrocarbons. However, this cracking is accompanied by a number of complex side reactions such as aromatization, polymerization, alkylation and the like. As a result of these complex reactions, a carbonaceous deposit is laid down on the catalyst which is referred to by petroleum engineers as "coke." The deposit of coke on the catalyst tends to seriously impair the catalyst efficiency for the principal reaction desired and to substantially decrease the rate of conversion and/or the selectivity of the process. Thus, it is common to remove the catalyst afer coke has been deposited thereon and to regenerate it by burning the coke in a stream of oxidizing gas. The regenerated catalyst is returned to the conversion stage of the process cycle.

Concomitant with the problem of coking is the problem of oil depositions on or into the catalyst particles. This entrained oil has been removed prior to coke removal by contacting the catalyst with steam and then burning off the carbonaceous deposits along with any coke. Unfortunately, it has been found that the cracking activity of a catalyst can deteriorate upon repeated use and regeneration wherein high temperature steam and burning in an oxygen atmosphere are employed. Many previous silica:alumina catalysts have been sensitive to steaming. Since steaming has been found to be the most effective way of removing entrained oil from the catalyst prior to coke removal and since steam is encountered in the kilns and reactions of many commercial catalytic cracking units, it is apparent that a catalyst such as ZSM-4 which has good thermal and steam stability properties is definitely to be desired.

ZSM-4 can be used either in the alkali metal form, e.g. the sodium form, the ammonium form, the hydrogen form, or another univalent or multivalent cationic form. Preferably, one or other of the last two forms is employed. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to ZSM-4 such as, for example, by, in the case of platinum, treating the zeolite with a platinum metal-containing ion. Thus, suitable platinum compounds include chloroplatinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic comlpex, e.g. $Pt(NH_3)_6Cl_4$ is particularly useful. For some hydrocarbon conversion processes, this noble metal form of the ZSM-4 catalyst is unnecessary such as in low temperature, liquid phase ortho xylene isomerization.

ZSM-4 when employed either as an adsorbent or as a catalyst in one of the aforementioned processes should be dehydrated, at least partially. This can be done by heating to a temperature in the range of 200° to 600°C. in an inert atmosphere, such as air, nitrogen, etc. and at atmospheric or subatmospheric pressures for between 1 and 48 hours. Dehydration can also be performed at room temperature merely by placing the ZSM-4 catalyst in a vacuum, but a longer time is required to obtain a sufficient amount of dehydration.

Zeolite ZSM-4 can be suitably prepared by preparing a solution containing $R_2O$, sodium oxide, an oxide of aluminum or gallium, an oxide of silica or germanium, and water and having a composition, in terms of mole ratios of oxides, falling within the following ranges:

Table 2

|  | Broad | Preferred |
|---|---|---|
| $\dfrac{Na_2O}{R_2O + Na_2O}$ | .31 to <1 | .75 to .99 |
| $\dfrac{R_2O + Na_2O}{YO_2}$ | .05 to .90 | .15 to .75 |
| $\dfrac{YO_2}{W_2O_3}$ | 3 to 60 | 6 to 30 |
| $\dfrac{H_2O}{R_2O + Na_2O}$ | 15 to 600 | 20 to 150 | wherein R is a tetramethylammonium cation, W is aluminum of gallium and Y is silicon or germanium maintaining the mixture until crystals of the zeolite are formed. Thereafter, the crystals are separated from the liquid and recovered. ZSM-4 is preferably formed as an aluminosilicate. The composition can be prepared utilizing materials which supply the appropriate oxide. Such compositions include for an aluminosilicate, sodium aluminate, sodium silicate, silica hydrosol, silica gel, silicic acid, sodium hydroxide and tetramethylammonium hydroxide. It will be understood that each oxide component utilized in the reaction mixture for preparing a member of the ZSM-4 family can be supplied by one or more initial reactants. For example, sodium oxide can be supplied by an aqueous solution of sodium hydroxide, or by an aqueous solution of sodium silicate. The reaction mixture can be prepared either batchwise or continuously. Crystal size and crystallization time of the ZSM-4 composition will vary with the nature of the reaction mixture employed.

One method of preparing this new zeolitic material comprises forming an aqueous solution of the reactant mixture which solution is designated for convenience as a crystallization directing agent, or CDA, which contains sodium oxide, alumina, silica, and water. Use of this crystallization directing agent has been found to lead to better yields of ZSM-4 crystals and greater reproducibility. The CDA mixture or agent can have a composition, in terms of mole ratios of oxides, within the following ranges;

Table 3

|  | Broad | Preferred | Most Preferred |
|---|---|---|---|
| $\dfrac{Na_2O}{SiO_2}$ | 1 to 4 | 1.5 to 3 | 1.85 |
| $\dfrac{SiO_2}{Al_2O_3}$ | 2 to 40 | 7 to 20 | 16 |
| $\dfrac{H_2O}{Na_2O}$ | 10 to 60 | 15 to 25 | 18 |

The crystallization directing agent mixture, is aged for a period of time of about 0.2 to 4 hours, preferably -continued

| NaTMAZSM-4 d(A°) I/I₀ | NaTMAZSM-4 d(A°) I/I₀ | HZSM-4 d(A°) I/I₀ | ZnNaTMAZSM-4 d(A°) I/I₀ |
|---|---|---|---|
| 2.65  6 | 2.65  3 | 2.64  7 | 2.64  8 |
| 2.63  5 | 2.63  3 | 2.61  3 | 2.57  2 |
| 2.56  1 | 2.55  2 | 2.55  1 | 2.53  8 |
| 2.52  6 | 2.52  3 | 2.52  5 | 2.51  2 |
| 2.49  4 | 2.48  2 | 2.49  2 | 2.48  1 |
| 2.43  1 | 2.41  1 | 2.42  1 | 2.42  2 |
| 2.40  3 | 2.395  2 | 2.39  1 | 2.39  6 |
| 2.38  5 | 2.37  2 | 2.36  2 | 2.35  1 |
| 2.34  1 | 2.30  1 |  | 2.29  4 |
| 2.28  7 | 2.27  2 | 2.27  3 | 2.265  2 |
| 2.19  2 |  | 2.18  2 | 2.17  4 |
| 2.17  1 |  | 2.15  2 | 2.145  3 |
| 2.14  3 | 2.14  2 | 2.125  3 | 2.115  3 |
| 2.10  4 | 2.10  2 | 2.10  3 | 2.10  2 |
| 2.09  2 | 2.08  1 | 2.07  1 | 2.06  3 |
| 2.04  1 | 2.03  1 | 2.02  2 | 2.015  1 |
| 2.02  3 | 2.015  1 | 2.01  2 | 2.00  6 |
| 1.99  6 | 1.98  4 | 1.98  3 | 1.97  6 |

| RENa ZSM-4 d(A°) I/I₀ | Ca NaTMAZSM-4 d(A°) I/I₀ | MgNa TMAZSM-4 d(A°) I/I₀ |
|---|---|---|
|  | 17.5  8 |  |
|  | 15.8  38 | 16.1  17 |
| 9.12  87 | 9.10  100 | 9.07  100 |
| 7.93  8 | 7.90  11 | 7.93  28 |
| 6.89  42 | 6.88  43 | 6.89  36 |
| 5.97  71 | 5.96  55 | 5.98  64 |
| 5.49  5 | 5.49  13 | 5.50  7 |
| 5.27  10 | 5.26  10 | 5.29  17 |
| 4.79  8 | 4.92  3 |  |
| 4.70  37 | 4.70  18 | 4.73  48 |
|  | 4.61  5 |  |
| 4.38  16 | 4.37  15 | 4.41  10 |
|  | 4.11  5 |  |
| 3.94  10 | 3.95  13 | 3.96  12 |
| 3.79  100 | 3.80  63 | 3.81  95 |
| 3.71  32 | 3.71  18 | 3.72  36 |
| 3.62  24 | 3.62  25 | 3.64  26 |
| 3.52  82 | 3.52  55 | 3.53  86 |
| 3.44  20 | 3.44  15 | 3.45  24 |
|  |  | 3.28  5 |
| 3.15  58 | 3.15  55 | 3.16  67 |
| 3.08  26 | 3.09  25 | 3.10  33 |
| 3.03  24 | 3.04  20 | 3.05  28 |
| 2.98  24 | 2.98  23 | 3.00  21 |
| 2.92  66 | 2.92  63 | 2.92  74 |
| 2.83  4 | 2.83  4 | 2.84  3 |
| 2.65  7 | 2.65  14 | 2.66  10 |
| 2.63  10 | 2.625  9 | 2.63  9 |
|  | 2.55  2 | 2.56  3 |
| 2.53  11 | 2.52  8 | 2.53  9 |
| 2.49  4 | 2.48  3 | 2.49  4 |
| 2.43  2 | 2.43  2 | 2.43  3 |
|  | 2.40  2 | 2.40  4 |
| 2.38  10 | 2.375  6 | 2.38  7 |
| 2.27  10 | 2.275  10 | 2.29  7 |
|  |  | 2.27  3 |
| 2.20  3 | 2.20  1 | 2.205  4 |
|  | 2.16  2 | 2.17  5 |
|  | 2.14  4 | 2.14  7 |
| 2.10  4 | 2.10  3 | 2.11  5 |
|  | 2.08  1 | 2.09  3 |
|  | 2.03  1 | 2.04  5 |
|  | 2.015  2 | 2.02  1 |
| 1.98  6 | 1.985  6 | 1.99  9 |

While ZSM-4 zeolites are useful in cracking and hydrocracking, they are outstandingly useful in other petroleum refining processes indicating again the unique catalytic characteristics of this family of zeolites. The latter processes include isomerization of n-paraffins and naphthenes, polymerization of compounds containing an olefinic or acetylinic carbon to carbon linkage such as isobutylene and butene-1, reforming, alkylation and dealkylation, isomerization of polyalkyl substituted aromatics, e.g. ortho xylene and disporportionation of aromatics, such as toluene to provide a mixture of benzene, xylenes and higher methylbenzenes. the ZSM-4 catalyst has exceptional high selectivity and under the conditions of hydrocarbon conversion provides a high percentage of desired products relative to total products compared with known zeolitic hydrocarbon conversion catalysts. Such selectivity, as expressed in terms of the selectivity factor described hereinabove, for example, is so superior to known zeolitic materials in these latter hydrocarbon conversion processes that the ZSM-4 catalysts become ideally suited for employment in these processes.

Zeolite ZSM-4, as indicated above, is also useful in other catalytic processes, such as catalytic cracking of hydrocarbons and hydrocracking. In addition to its stability under these conditions, it provides conversion of the cracked oil to materials having lower molecular weights and boiling points which are of greater economic value. Its ability to be stable under high temperatures and/or in the presence of high temperature steam is extremely important for a cracking catalyst. During catalytic conversion of high boiling hydrocarbons to nant amount of one or more of the above cations.

A wide variety of acidic compounds can be employed to prepare the hydrogen form of the ZSM-4 catalyst. These acidic compounds, which are a source of hydrogen ions, include both inorganic and organic acids.

Representative inorganic acids whch can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid ($NH(SO_3H)_2$), chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3.NO$) hydroxylamine disulfonic acid [$(HSO_3)_2)NOH$], nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, citric acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic dicarboxylic and polycarboxylic acids include, 1,2-cyclohexanedicarboxylic acid, 1,4-cyclohexanedicarboxylic acid, isophthalic acid, terephthalic acid, 1,8-naphthalenedicarboxylic acid, 1,2-naphthalenedicarboxylic acid, tetrahydrophthalic acid, 3-carboxycinnamic acid, hydrocinnamic acid, pyrogallic acid, benzoic acid, ortho, meta and paramethyl, hydroxy, chloro, bromo and nitro-substituted benzoic acids, phenylacetic acid, mendelic acid, benzylic acid, hippuric acid, benzenesulfonic acid, toluenesulfonic acid, methanesulfonic acid and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising crosslinked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compound which decompose to provide hydrogen ions when an aluminosilicate treated with a solution of said ammonium compound is subjected to temperatures below the decomposition temperature of the aluminosilicate.

Representative ammonium compounds which can be employed salts ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium malonate, ammonium oxalate, ammonium palmitate, ammonium tartrate and the like. Still other ammonium compounds which can be employed include quaternary ammonium compounds such as tetramethylammonium hydroxide, trimethylammonium chloride. Other compounds which can be employed are nitrogen bases such as the salte of guanidine, pyridine, quinoline, etc.

A wide variety of metallic compounds can be employed with facility as a source of metallic cations and include both inorganic and organic salts of the metals of Groups I through VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitation on the particular metal salt or salts employed is that it be soluble in the fluid medium in which it is used. The preferred salts are the chlorides, nitrates, acetates and sulfates.

Representative metal salts which can be employed, aside from the mixtures of rare earth metals mentioned above, include silver chloride, silver sulfate, silver nitrate, silver acetate, silver arsinate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, manganese chloride, manganese sulfate, manganese acetate, manganese carbonate, manganese formate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sul- 0.5 to 2 hours, at 40° to 70°C., preferably 60°C., and mixed into a second solution containing sodium oxide, silica, and water. A third solution containing alumina and water is added to the resultant solution with stirring thereby forming a slurry. The amounts of sodium oxide, silica, alumina and water in these later solutions are such that when added to the CDA, the amounts of the various ingredients fall within the broad range of Table 2. The slurry is heated for a short period of time at about 100°C., say, between about 0.5 and 1 hour, and the resultant product is filtered. The resulting filter cake comprises an amorphous material which is mixed in its wet state with solution, e.g. an aqueous solution, of tetramethylammonium hydroxide, preferably a somewhat dilute solution of about 5 to 25 percent concentration, weight basis. After thorough mixing, the last-described mixture, which is in the form of a slurry, is heated over a period of time to produce a crystalline product. It is generally heated at a temperature of about 100°C. for between about 1 and 3 days. The product is then filtered, washed until the washings show a pH below 11, and dried at 100°–110°C. for several hours.

When preparing the ZSM-4 catalyst, it is preferred to mix the various solutions employed in a mixing nozzle so as to effect maximum contact of the respective ingredients together. This contact in a mixing nozzle precedes heating of any resultant solution and crystallization of the aluminosilicate. This method is preferred whether or not a CDA is utilized and whether or not the tetramethylammonium compound is introduced directly into the solution or passed over the wet filter cake as discussed above.

As will be seen from the conditions and results as set forth in Examples 7–12 hereinafter, less tetramethylammonium oxide is required to prepare ZSM-4 crystals by first preparing a wet filter cake than by the solution method normally utilized, provided sodium hydroxide is included in the tetramethylammonium ion solution to balance the electronegative charge of the aluminosilicate tetrahedra. However, as the ratio of tetramethylammonium ions to sodium ions in the solution passed over the filter cake increases, the time of crystallization increases. Thus, if the time for crystallization of the ZSM-4 crystals is not critical, one can prepare ZSM-4 crystals employing a fraction of the amount of tetramethylammonium commercially employed in the solution method and compensating the electronegative charge of the aluminosilicate tetrahedra by increasing the sodium ion content in the solution passed over the wet filter cake proportionately.

Members of the ZSM-4 family, can be base exchanged to remove the sodium cations by such ions as hydrogen (from acids), ammonium, and alkylammonium and arylammonium including $RNH_3$, $R_3NH+$, $R_2NH_2+$ and $R_4N^+$ where R is alkyl or aryl, provided that steric hindrance does not prevent the cations from entering the cage, and cavity structure of the ZSM-4 aluminosilicate composition. The hydrogen form of ZSM-4, useful in such hydrocarbon conversion processes as isomerization of poly-substituted alkyl aromatics and disproportionation of alkyl aromatics, is prepared, for example, by base exchanging the sodium form with, say, ammonium chloride or hydroxide whereby the ammonium ion is substituted for the sodium ion. The composition is then calcined at a temperature of, say, 1,000°F. causing evolution of ammonia and retention of a proton in the composition. Other replacing cations include cations of the metals of the Periodic Table, especially metals other than sodium, especially metals of Group II, e.g. zinc and Group VIII of the Periodic Table and rare earth metals and manganese.

The above crystalline zeolite especially in its metal, hydrogen, ammonium, alkylammonium and arylammonium forms can be beneficially converted to another form by thermal treatment. This thermal treatment is generally performed by heating one of these forms at a temperature of at least 700°F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1,600°F. at which temperature some decomposition begins to occur. The thermally treated product is particularly useful in the catalysis of certain hydrocarbon conversion reactions.

Regardless of the cations replacing the sodium in the synthesized form of the ZSM-4, the spatial arrangement of the aluminum, silicon and oxygen atoms which form the basic crystal lattice of ZSM-4, remains essentially unchanged by the described replacement of sodium or other alkali metal as determined by taking an X-ray powder diffraction pattern of the ion-exchanged material. Such X-ray diffraction pattern of the ion-exchanged ZSM-4 reveals a pattern substantially the same as that set forth in Table 1 above.

Ion exchange of the zeolite can be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a member of rare earth metals suitably in the chloride form. Thus, a rare earth chloride solution commerically available can be used to replace substantially all of the sodium in as synthesized ZSM-4. This commercially available rare earth chloride solution contains chlorides of rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides, but having a lower cerium content. It consists of the following rare earths determined as oxides: lanthanum 45–65 percent by weight, cerium 1–2 percent weight, praseodymium 9–10 percent by weight, neodymium 32–33 percent by weight, samarium 5–7 percent by weight, gadolinium 3–4 percent by weight, yttrium 0.4 percent by weight, and other rare earths 1–2 percent by weight. It is to be understood that other mixtures of rare earths are also applicable for the preparation of the novel compositions of this invention, although lanthanum, neodymium, praseodymium, samarium and gadolinium as well as mixtures of rare earth cations containing a predomiproportionation. The isomerization tends first to form meta xylene, and thence to proceed to para xylene. On the other hand, the disproportionation reaction tends to form a mixture of methyl benzenes, primarily toluene and trimethyl benzenes. Thus, a suitable isomerization catalyst should be one which provides the desired xylene isomers in good quantities relative to the amounts of disproportionation products obtained. The HZSM-4 catalyst has been found to provide a ratio of isomerization products to disproportionation products of at least 4 while other zeolite catalysts proposed under the same reaction conditions were unable to achieve such high ratio. These include rare earth exchanged Linde Zeolite Y catalyst, rare earth exchanged Linde Zeolite X catalyst, HY, rare earth HY and hydrogen mordenite. The HZSM-4 catalyst provides the selectivities at various silica/alumina mole ratios such as 5.8/1;7/1 and 13/1.

The unusual selectivity is not unique to this isomerization test but is intrinsic. For example, the HZSM-4 catalyst is useful under certain more severe processing conditions for disproportionation of toluene, the process provides benzene, xylenes and other methylbenzenes. Cracking of the aromatics to lighter boiling nonaromatic products is a competing side reaction. The HZSM-4 catalyst has been found to provide a high selectivity in terms of the ratio of disproportionation products to cracked products obtained. Ratios obtained are about 100 to 1,000 whereas other zeolite catalysts such as rare earth exchanged faujasite, hydrogen faujasite, hydrogen mordenite, etc., give ratios of about 6. The selectivity factor as defined by the o-xylene test characterizes the uniqueness of this catalyst as compared to all other known zeolite catalysts. Thus, the selectivity of the HZSM-4 catalyst is superior to all known zeolite catalysts in both isomerization and disproportionation processes.

Employing the ZSM-4 catalyst of this invention, containing a hydrogenation component, heavy petroleum residual stocks, cycle stocks, and other hydrocrackable charge stocks can be hydrocracked at temperatures between 400°F. and 825°F. using molar ratios of hydrogen to hydrocarbon charge in the range between 2 and 80. The pressure employed will vary between 10 and 2,500 psig. and the liquid hourly space velocity between 0.1 and 10.

Employing the catalyst of this invention for catalytic cracking, hydrocarbon cracking stocks can be cracked at a liquid hourly space velocity between about 0.5 and 50, a temperature between about 550°F. and 1,100°F., a pressure between about subatmospheric and several hundred atmospheres.

Employing a catalytically active form of a member of the ZSM-4 family of zeolites of this invention containing a hydrogenation component, reforming stocks can be reformed employing a temperature between 700°F. and 1,000°F. The pressure can be between 100 and 1,000 psig. but is preferably between 200 and 700 psig. The liquid hourly space velocity is generally between 0.1 and 10, preferably between 0.5 and 4 and the hydrogen to hydrocarbon mole ration is generally between 1 and 20 preferably between 4 and 12.

The catalyst can also be used for hydroisomerization of normal paraffins when provided with a hydrogenation component, e.g. platinum. Hydroisomerization is carried out at a temperature between 200° and 700°F., preferably 300° to 550°F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30°F. and 500°F.

Other reactions which can be accomplished employing the catalyst of this invention containing a metal, e.g. platinum, include hydrogenation-dehydrogenation reactions and desulfurization reactions.

In order to more fully illustrate the nature of the invention and the manner of practicing the same, the following examples are presented.

EXAMPLE 1

Zeolite ZSM-4 was synthesized as follows. Four solutions were prepared, identified as A, B, C, and D:

| | | |
|---|---|---|
| Solution A, or CDA solution: | | |
| Sodium aluminate | 19.2 | grams |
| Sodium hydroxide pellets | 154.4 | grams |
| Sodium silicate | 275.2 | grams |
| Water | 612 | |
| Solution B: | | |
| Sodium silicate | 1925 | grams |
| Water | 1375 | grams |
| Solution C: | | |
| Aluminum chloride | 150 | grams |
| Water | 1300 | grams |
| solution D: | | |
| Tetramethylammonium hydroxide as 10% aqueous solution | 240 | grams |

Solution A was prepared by dissolving the NaOH and aluminate in water, adding the silicate, and heating the resulting clear solution at 60°C. for 0.5 hours. It had the following composition, in terms of mole ratios of oxides:

| | |
|---|---|
| $\dfrac{Na_2O}{SiO_2}$ | 1.85:1 |
| $\dfrac{SiO_2}{Al_2O_3}$ | 16:1 |
| $\dfrac{H_2O}{Na_2O}$ | 18:1 |

Solution A was added to Solution B in a Waring Blender, mixed for 5 to 10 minutes at reduced speed, and then Solution C was added rapidly, with stirring continued for about 1 minute. The resulting slurry was heated at 100°C. for 0.5 hour and filtered. Solution D was thoroughly mixed with the filter cake and the mixture heated at 100°C. for 3 days. The mixture was then divided into two parts, and one of these was filtered, washed until the washings had a pH below 11, and dried at 110°C. for 3 hours. The second part was cooked at 100°C. for another 4 days, filtered, then washed and dried like the first part. The following data were obtained on the two samples:

fide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, proasedymium sulfate, praseodymium sulfide, selenium chloride, selenium bromide, tellurium chloride, tellurium bromide, copper sulfate and mercury nitrate.

The actual procedure employed for carrying out the fluid treatment of the aluminosilicate can be accomplished in a batchwise or continuous method under atmospheric, subatmospheric or superatmospheric pressure. A solution of the ions of positive valence in the form of a molten material, vapor aqueous or non-aqueous solution, can be passed slowly through a fixed bed of the aluminosilicate. If desired, hydrothermal treatment or a corresponding non-aqueous treatment with polar solvents can be effected by introducing the aluminosilicate and fluid medium into a closed vessel maintained under autogeneous pressure. Similarly, treatments involving fusion or vapor phase contact can be employed providing the melting point or vaporization temperature of the acid or ammonium compound is below the decomposition temperature of the aluminosilicate.

While water will ordinarily be the solvent in the base exchange solutions employed, it is contemplated that other solvents, although generally less preferred, can be used in which case it will be realized that the above list of exchange compounds can be expanded. Thus, in addition to an aqueous solution, alcohol solutions and the like of the exchange compounds can be employed in producing the exchanged catalyst of the present invention. Generally, the alkali metal content is reduced to less than 4 percent by weight and preferably less than 1 weight percent. When the exchanged zeolite is prepared, it is generally, thereafter, treated with a suitable solvent, e.g. water, to wash out any of the anions which may have become temporarily entrained or caught in the pores or cavities of the crystalline composition.

As indicated above, the aluminosilicates prepared by the instant invention are formed in a wide variety of particular sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-4 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-4, i.e. combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g. bentonite and kaolin, to improve the crush strength of the catalyst under commercial operating conditions. These materials, i.e. clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally occurring clays which can be composited with the ZSM-4 catalyst include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. One way to render the clay suitable for use is to treat them with sodium or potassium hydroxide, and calcium at temperatures ranging from 230°F. to 1,600°F. thereby preparing a porous crystalline zeolite. Binders useful for compositing with the ZSM-4 catalyst also include inorganic oxides, notably alumina.

In addition to the foregoing materials, the ZSM-4 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-4 and inorganic oxide gel matrix vary widely with the crystalline aluminosilicate content ranging from about 1 to about 90 percent by weight and more usually, particularly when the composite is prepared in the form of beads in the range of about 2 to about 50 percent by weight of the composite.

With respect to ZSM-4's isomerization properties, it has been found that the hydrogen form ZSM-4 is between 4 and 10 times more selective than a rare earth exchanged Linde zeolite X aluminosilicate for ortho xylene isomerization. Additionally, this isomerization can be performed without impregnation into or onto the catalyst of a noble metal, such as platinum and without employing hydrogen to assist in the isomerization. The fact that hydrogen can be dispensed with when employing the HZSM-4 catalyst for aromatic isomerization is particularly significant since the presence of hydrogen in an aromatic isomerization system, in addition to being expensive, tends to cause some saturation of the aromatic ring which results in subsequent cracking to undesired by-products. Furthermore, the HZSM-4 catalyst can be employed while the xylene being isomerized is in the liquid phase, enough pressure being maintained on the xylene to keep it in that phase. The catalyst is also useful in isomerization or hydroisomerization of parrafins.

In the reaction of ortho xylene over an acidic catalyst there are two major competing hydrocarbon conversion reactions taking place, i.e. isomerization and dis-

Table 6

| C/O | LHSV | Sample Conditions | Conversion Volume % | C₄-Free Gasoline Volume % | C₄ Volume % | Coke Weight % | Dry Gas Weight % |
| --- | --- | --- | --- | --- | --- | --- | --- |
| 1.5 | 32 | As Calcined | 45.3 | 27.3 | 12.1 | 4.9 | 8.5 |
| 0.38 | 16 | As Calcined | 23.8 | 17.8 | 3.2 | 1.47 | 3.8 |
| 0.38 | 16 | Steamed for 24 Hours | 12.3 | 12.2 | 1.2 | .49 | .78 |
| 1.5 | 32 | Steamed for 24 Hours | 20.9 | 19.2 | 0.72 | 1.67 | — |

In this table, C/O is the catalyst:oil ratio, and LHSV is liquid hourly space velocity. The "sample conditions" refer to the material as calcined above, and as calcined followed by steaming for 24 hours at about 1,200°F.

EXAMPLE 6

Four solutions were prepared, identified as H, F, A, and E:

| ZSM-4 From Sodium Aluminate and Sodium Silicate Solutions | |
| --- | --- |
| Solution H: | |
| Sodium silicate | 3400 g |
| Water | 2130 ml |
| | 5530 g |
| Solution F: | |
| Sodium aluminate | 236 g |
| Moles Na₂O/mole Al₂O₃ = 1.15 | |
| Ign loss = 24 percent | |
| Water | 2080 ml |
| Water | 2316 g |
| Solution A: | |
| NaOH (9% NaOH) | 44.5 g |
| Water | 495.0 ml |
| | 539.5 g |
| Solution E: | |
| Tetramethylammonium chloride crystals | 110 g |
| Water | 890 ml |
| | 1000 grams |

Solution A was mixed into Solution F and into the resultant mixture was mixed Solution E. The mixture of Solutions A, F and E was mixed into Solution H and the resultant slurry was heated at 100°C. for between about 4 and 5 days until crystals formed. The crystallized product was filtered, washed and dried at about 120°C. It was analyzed and found to be a ZSM-4 aluminosilicate.

EXAMPLE 7

A CDA solution containing 68.8 grams sodium silicate, 4.8 grams sodium aluminate (approximate composition 30.2 percent Na₂O, 44.5 percent Al₂O₃; remainder ignition loss), 38.6 grams 98 percent sodium hydroxide pellets and 153.0 grams water was prepared. It was formed by dissolving the sodium aluminate into the water and thence adding to that mixture the sodium hydroxide. The solution was maintained at 140°–150°F. and into it was introduced the sodium silicate. The resultant solution was permitted to age for 15 minutes. The resultant solution was added to 270.0 grams sodium silicate, 47.5 grams Al₂(SO₄)₃.14H₂O was dissolved in 150 grams water together with 25.0 grams 96.5 percent H₂SO₄. The resultant aluminum sulfate-sulfuric acid-water solution was mixed into the solution of sodium silicate and CDA. Into that solution was mixed 36.0 grams of 24 percent tetramethylammonium hydroxide in methanol. That resulting solution was held for 16 hours at 212°F. in a loosely capped container to evaporate the methanol. The container was closed and heated at 212°F. until crystals formed. The crystals were filtered and washed and were found to a ZSM-4 composition.

EXAMPLE 8

A CDA solution, as formed in Example 7, was prepared and as in Example 7, was mixed into sodium silicate. An aluminum sulfate-sulfuric acid-water solution was prepared, as in Example 7, and mixed into the CDA and sodium silicate solution. The resultant solution was heated for one hour at 212°F. and a product crystallized from the solution. It was filtered and the filter cake was held while the supernatant liquid was discarded. 36.0 grams of a 24 percent solution of tetramethylammonium hydroxide in methanol were mixed into the filter cake. The so treated filter cake was held for 16 hours at 212°F. in a loosely capped container to evaporate the methanol. The container was closed and heated at 212°F. until crystals formed. The crystals were washed, dried and examined under X-ray. The X-ray pattern showed the composition to be a ZSM-4 composition characterized by high degree of crystallinity.

EXAMPLE 9

Example 8 was repeated except that the filter cake was treated with a mixture of 28.0 grams 24 percent tetramethylammonium hydroxide in methanol with 8 grams of 10 percent NaOH solution obtained by mixing the NaOH with the tetramethylammonium hydroxide. Crystals were obtained upon heating the closed container at 212°F. in about 3 days. Examination of the dried crystals revealed that there was a ZSM-4 zeolite having good crystallinity.

EXAMPLE 10

Example 9 was repeated except that the amount of tetramethylammonium hydroxide was 20.0 grams and the amount of sodium hydroxide solution was 16 grams. Examination of the product showed it to be ZSM-4 zeolite having a high degree of crystallinity.

EXAMPLE 11

Example 10 was repeated except that 12.0 grams of tetramethylammonium hydroxide solution and 24.0 grams of sodium hydroxide were employed. Crystals crystallized out of the heated solution in 4 days and on examination revealed a generally high degree of crystallinity. The product was a ZSM-4 catalyst having a silica:alumina mole ratio of 6.8.

EXAMPLE 12

Example 11 was repeated except that 4.0 grams of tetramethylammonium hydroxide solution were employed and 32.0 grams of sodium hydroxide solution. Crystals crystallized from the solution in 5 days. When examined under X-ray, it was revealed that the product

Table 4

| Sorption at 20°C. percent by weight | | Quantitative Analysis, Molar Ratio | | | |
|---|---|---|---|---|---|
| Cyclohexane 20 mm Hg | Water 12 mm Hg | [(CH$_3$)$_4$N]$_2$O | Na$_2$O | Al$_2$O$_3$ | SiO$_2$ |
| 3-day sample 5.8 | 13.9 | — | — | — | — |
| 7-day sample 4.6 | 13.6 | 0.19 | 0.84 | 1.00 | 7.35 |

Both samples exhibited the essential X-ray powder diffraction pattern of Table 1.

EXAMPLE 2

Zeolite ZSM-4 was also synthesized in the following way. Four solutions were prepared, identified as A, B, C, and D:

| | | |
|---|---|---|
| Solution A, or CDA Solution: | | |
| Same as in Example 1. | | |
| Solution B: | | |
| Sodium silicate | 218 | grams |
| Water | 170 | grams |
| Solution C: | | |
| Aluminum chloride | 17.2 | grams |
| Sulfuric acid | 4.3 | grams |
| Water | 300 | grams |
| Solution D: | | |
| Tetramethylammonium hydroxide as 10% aqueous solution | 15 | grams |

Solutions A and B were mixed a few minutes in the Waring Blender, and then Solution C was added, as in Example 1. The resulting slurry was heated at 100°C. for 0.5 hours, filtered, and the filter cake divided into three parts. One of these, weighing 100 grams, was mixed with Solution D, the mixture heated at 100°C. for 6 days, filtered, washed, and dried. Chemical analysis of the calcined product showed the formula to be:

0.2 R$_2$O:0.78 Na$_2$O:Al$_2$O$_3$:7.85 SiO$_2$ where R is tetramethylammonium ion. At 20°C. this material sorbed 4.7 percent by weight of cyclohexane at 20 mm mercury and 13.0 percent by weight of water at 12 mm mercury. The material exhibited the X-ray powder diffraction pattern essentially as shown in Table 1.

EXAMPLE 3

Two other species of ZSM-4 were prepared, identified below as Examples 3A and 3B using substantially the procedures of Examples 1 and 2. For convenience, all species, including those of Examples 1 and 2, are tabulated in Table 5, together with crystallization time and sorption data.

EXAMPLE 4

Four solutions were prepared, identified as A, B, C, and D:

| | | |
|---|---|---|
| Solution A, or CDA Solution: | | |
| Sodium aluminate | 19.2 | grams |
| Sodium hydroxide pellets | 154.4 | grams |
| Sodium silicate | 275.2 | grams |
| Water | 612 | grams |
| Solution B: | | |
| Sodium silicate | 1080 | grams |
| Solution C: | | |
| Aluminum sulfate 14-hydrate | 190 | grams |
| Water | 873 | grams |
| Sulfuric Acid, 98 percent | 160 | grams |
| Solution D: | | |
| Tetramethylammonium hydroxide, 24 percent in methanol | 302 | grams |

Solution A was prepared by dissolving the NaOH and sodium aluminate in water, adding the silicate and heating the resulting clear solution at 60°C. for 0.5 hour. Solutions B, C and D were added to a 1 gallon Waring Blender containing Solution A and agitated for about 5 minutes. The uncovered mixture was heated at 60°–100°C. for several hours to drive the methanol out, then covered and heated at 100°C. until crystallized (about 6 days). The final product was filtered, washed, and dried at 120°C. It had the following analysis;

0.23 [(CH$_3$)$_4$N]$_2$O:0.80 Na$_2$O:Al$_2$O$_3$:8.68 SiO$_2$

Sorption: 4.5 percent of cyclohexane at 20 mm Hg; 12.2 percent of water at 12 mm Hg.

EXAMPLE 5

A sample of ZSM-4 was prepared according to Example 1. The analysis of the crystalline product was:

0.15 [(CH$_3$)$_4$N]$_2$O:0.91 Na$_2$O:Al$_2$O$_3$:6.7 SiO$_2$

The sample was base-exchanged to ammonium form by passing a stream of 0.5 N ammonium chloride over a bed of the zeolite until no sodium was detected in the effluent. The exchanged sample contained only 0.26 percent of sodium. The ammonium form was calcined at 1,000°F. for 3 hours in order to obtain the hydrogen form. The latter sorbed 3.2 percent of cyclohexane at 20 mm Hg and 14 percent of water at 12 mm Hg. The sample was tested for catalytic cracking activity in the following manner.

The sample was used to catalyze the cracking of a Mid-Continent gas oil having a boiling point range of 450°–950°F. and a specific gravity of 0.88 grams per cubic centimeters. The gas oil was vaporized and pre-

Table 5

| | Crystallization Time, Days | Sorption, Weight Percent | | Quantitative Analysis, Molar Ratio | | | |
|---|---|---|---|---|---|---|---|
| | | Water(12 mm Hg) | Cyclohexane(20 mm Hg) | [(Me)$_4$N]$_2$O | Na$_2$O | Al$_2$O$_3$ | SiO$_2$ |
| Example 3A | 3 | 13.6 | 6.2 | 0.18 | 0.82 | 1.00 | 7.25 |
| Example 3B | 8 | 13.6 | 6.6 | 0.18 | 0.91 | 1.00 | 7.64 |
| Example 1 | 7 | 13.6 | 4.6 | 0.19 | 0.84 | 1.00 | 7.35 |
| Example 2 | 6 | 13.0 | 4.7 | 0.20 | 0.78 | 1.00 | 7.85 | heated to 875°F., and then pumped at a rate of 6.67 cubic centimeters per minute through a 100 cubic centimeter bed of the sample maintained at 900°F. by external heat. Reactor effluents were condensed and separated into C$_4$-free gasoline, dry gas comprising C$_1$–C$_3$ material, a C$_4$ fraction, coke, and uncracked oil. Several runs were made, with the duration of each being 10 minutes. The following date were observed:

pared according to the example in a ZSM-4/alpha alumina monohydrate weight ratio of 70/30. The water content of the mixture was adjusted so that the mixture contained about 65 percent by weight solids. At this water level, the combined ZSM-4/alpha alumina monohydrate composition had a dough-like consistency. It was extruded through an extruder and chopped into 1/16 inch extrudates. The product was dried for 17 hours at 900°F. while air passed through the catalyst at a rate of 3 volumes air per volume of catalyst per minute.

The ZSM-4 catalyst bonded with the alumina was evaluated for ortho xylene isomerization over 4 hours employing 12 cubic centimeters of the catalyst under a temperature of 400°F., a pressure of 200 psig. and a liquid hourly space velocity of 2. It was found to convert 75.1 percent of the charged ortho xylene. The product contained 67.5 weight percent isomerization products and 7.45 by weight of disproportionation products for a ratio of isomerization products to disproportionation products of 9.0. Thus, the catalyst not only exhibited good conversion of the ortho xylene but, perhaps more significantly, a high selectivity as seen from the ratio of isomerization products to disproportionation products.

EXAMPLE 18

In a manner similar to Example 17, the ZSM-4 catalyst prepared in accordance with that example and having a silica-alumina mole ratio of 7:1 and having a particle size of 8 × 14 Tyler mesh was evaluated for ortho xylene isomerization under the conditions employed in that example. When evaluated for o-xylene isomerization catalysis for 5 hours, 77.7 percent by weight o-xylene was converted and the weight ratio of isomers to disproportionation products was 7.37.

EXAMPLE 19

A HZSM-4 product having a silica:alumina mole ratio of 7:1 was composited with kaolin clay. It was formed into a composite having a size of about 8 × 14 Tyler mesh at a weight ratio of HZSM-4/kaolin clay of 80/20. It was similarly evaluated for ortho xylene isomerization under the conditions set forth in Example 17. It provided a 34.8 weight percent conversion with a weight ratio of isomers to disproportionation products of 11.0.

An acid ZSM-4 catalyst having a sodium content of 0.34 weight percent was prepared. A 36.2 gram aliquot was pelleted, crushed and screened to 14–25 Tyler mesh. It was heated in a muffle at a rate of 2°F. per minute to 1,000°F. and held at this temperature for 10 hours. Impregnation of 2.5 weight percent platinum was by vacuum spray procedure using a water solution of sodium chloroplatinate (prepared from chloroplatinic acid and sodium hydroxide, 2 moles NaOH per mole chloroplatinic acid). This was wet aged 20 hours at 230°F., reduced 2 hours at 250°F. and 2 hours at 950°F. in hydrogen, and purged with nitrogen. The resultant catalyst had a surface area of 324 square meters per gram and a sodium content of 1.2 weight percent.

For purposes of comparison, a Linde zeolite X was base exchanged with rare earth metals for 20 hours and again over a weekend at 180°F., using 3 contacts of rare earth per equivalent of sodium. It was washed, filtered and overn-dried at 450°F. between contacts and again after the second contact except the oven temperature was 230°F. Sodium content was 0.33 weight percent, rare earth oxides 30.2 weight percent, calcium 0.49 weight percent, silica 40.9 weight percent, and alumina 28.4 weight percent. The rare earth-exchanged zeolite X (REX) was pelleted, crushed, screened, calcined, impregnated with 2.5 weight percent platinum by the same procedure as above, wet aged and reduced as was the platinum-acid ZSM-4 catalyst above. Properties of the platinum-REX catalyst were: surface area 399 square meters per gram, sodium content 1.2 weight percent. The two catalysts were evaluated for hydrocracking activities employing a pretreated refinery hydrocracking stock having an API gravity of about 27.2 and having the following vacuum assay:

| Vacuum Assay, Volume Percent | |
| --- | --- |
| Initial Boiling Point °F. | 398 |
| 5% | 505 |
| 10% | 533 |
| 30% | 608 |
| 50% | 662 |
| 70% | 724 |
| 90% | 807 |
| 95% | 834 |
| Weight Percent | |
| Trace IBP (approx.) °F. | 180–225 |
| 1–290°F. | 0.05 |
| 290–380 | 0.48 |
| 380–450 | 2.49 |
| 450–500 | 5.57 |
| 500–550 | 8.80 |
| 550–600 | 13.47 |
| 600–650 | 15.96 |
| 650–700 | 19.14 |
| 700–750 | 12.67 |
| 750–800 | 10.34 |
| 800–850 | 6.15 |
| 850 | 4.93 |
| EP °F. | 920 |
| Molecular Weight | |
| C, weight % | 86.37 |
| H, weight % | 12.14 |
| S, weight % | 0.20 |
| N, ppm | 35 |
| Aniline No. °F. | 154.9 |
| Pour Point °F. | 65 |

The oil was hydrocracked under substantially the same conditions, these conditions being reported in the table below, which shows the yield of the various products.

Table 6

| Catalyst | Pt-Acid ZSM-4 | Pt - REX |
| --- | --- | --- |
| Catalyst Age, Hours | 13–17 | 17–21 |
| Temperature, °F. | 606 | 635 |
| LHSV | 0.5 | 0.52 |
| H$_2$ Charge Rate SCF/B | 16449 | 19918 |
| Gravity, TLP*, °API | 63.3 | 66.0 |
| Pressure, Psig. | 2000 | 2000 |
| Conversion, Volume % | 93.2 | 97.7 |
| H$_2$ Consumption SCF/B | 2162 | 1886 |
| H$_2$ Consumption Wt. % Chg. | 3.68 | 3.2 |
| Methane, Weight % | 0.06 | 0.02 |
| Ethane, Weight % | 0.30 | 0.09 |
| Propane, Weight % | 2.76 | 2.51 |
| Dry Gas, Weight % | 3.12 | 2.6 |
| Isobutane, Volume % | 17.7 | 16.8 |
| Normal Butane and Butenes Volume % | 3.6 | 4.0 |
| Isopentanes Volume % | 15.7 | 13.9 |
| Normal Pentane, Pentene, Cyclopentene Volume % | 2.0 | 4.1 |
| 125–180°F. Volume % | 19.4 | 23.4 |
| 180–380°F. Volume % | 62.7 | 64.5 |
| 380°F.+ Volume % | 6.8 | 2.3 |
| C$_4$+ Volume % | 127.9 | 128.9 |
| C$_5$ Volume % | 106.6 | 108.1 |
| Material Balance | 96.0 | 99.5 |

*Total Liquid Product was a mixture of ZSM-4 catalyst and zeolite 13 X.

EXAMPLE 13

A solution of 47.5 grams $Al_2(SO_4)_3 \cdot 14H_2O$, 24.7 grams 97 percent $H_2SO_4$ and 128.0 grams water were mixed into a solution comprising a 338.8 grams sodium silicate, 45.3 grams 98 percent sodium hydroxide and 125.0 grams water. To the resultant mixture was added 4.8 grams sodium aluminate (approximate composition by weight 30.2 percent $Na_2O$, 44.5 percent $Al_2O_3$; remainder ignition loss) and 50.0 grams water. To the resulting solution 36.0 grams of 50 percent tetramethylammonium chloride solution was added. The solution was then heated at 212°F. for between 2 and 5 days, when crystallization of ZSM-4 composition occurred. The crystals were washed and dried and determined to have a crystal size of about 5 microns.

EXAMPLE 14

A CDA solution was formed by dissolving 173.70 grams of 97.4 percent sodium hydroxide in 688.80 grams water and adding thereto 21.60 grams of sodium aluminate and 309.60 grams sodium silicate. Into a Waring Blender of one gallon capacity was introduced a sodium silicate aqueous solution containing 1215.00 grams sodium silicate. The powerstat on the Waring Blender was turned on at a low speed of about 65 percent capacity and to the sodium silicate solution was added the CDA solution. After the CDA solution was added, an alum solution containing 213.78 grams $Al_2(SO_4)_3 \cdot 14 H_2O$, 248.40 grams 96.5 percent $H_2SO_4$ and 1080.00 grams $H_2O$ was added. This caused the mixture in the Waring Blender to thicken. Mixing continued with the aid of a spatula. When the mixture was mixed thoroughly, 325.80 grams of a 25 percent aqueous solution of tetramethylammonium hydroxide was added until a smooth paste was formed. The product was poured into two 2-quart jars, sealed and placed in a 100°C. steam box. A product crystallized after 34 days. It was a ZSM-4 composition having a silica:alumina mole ratio of 13:1.

EXAMPLE 15

Employing the procedure of Example 7, a starting gel composition was prepared having a tetramethylammonium oxide:alumina ratio of 2.0:1, a $Na_2O:Al_2O_3$ ratio of 5:1, a $SiO_2:Al_2O_3$ of 16:1 and a $H_2O:Al_2O_3$ ratio of 360:1. The final product was determined to have the following mole ratios: tetramethylammonium oxide:alumina .13:1, $Na_2O:Al_2O_3$ .72:1, and $SiO_2:Al_2O_3$ of 5.96:1. The product also contained trace amounts of synthetic faujasite.

EXAMPLE 16

Employing the procedure of Example 15, a starting gel composition was prepared having a mole ratio of tetramethylammonium oxide:alumina of .68:1, be a $Na_2O:Al_2O_3$ of 6.8:1; a $SiO_2:Al_2O_3$ of 16.0:1 and a $H_2O:Al_2O_3$ of 279:1. The final product was determined to have a tetramethylammonium oxide:alumina mole ratio of .16:1, a $Na_2O:Al_2O_3$ mole ratio of .83:1, a $SiO_2:Al_2O_3$ mole ratio of 5.78. The product crystals were ZSM-4 crystals exhibiting a rod-like habit. The crystals sorbed 3.9 percent by weight cyclohexane measured at 20°C. and 20 mm Hg and 12.3 percent by weight water determined at 20°C. and 12 mm Hg.

EXAMPLE 17

Four solutions were prepared designated below as Solutions A, 1, 2 and 3. In terms of their oxides, the starting composition had the following mole ratios based on alumina.

| | |
|---|---|
| Tetramethylammonium oxide | 0.41 |
| Sodium oxide | 5.74 |
| Alumina | 1.0 |
| Silicate | 16.7 |
| NaCl | 0.82 |
| $NaSO_4$ | 4.90 |
| $H_2O$ | 320 |

Solution A was formed by mixing the sodium hydroxide with the sodium silicate. The respective ingredients of the solutions are shown below:

| | | | |
|---|---|---|---|
| Solution A: | | | |
| | Sodium silicate | 105 | lbs. |
| | NaOH | 13.4 | lbs. |
| | $H_2O$ | 37.1 | lbs. |
| Solution 1: | | | |
| | $Al_2(SO_4)_3 \cdot 18H_2O$ | 14.95 | lbs. |
| | $H_2SO_4$(98 % by weight) | 7.32 | lbs. |
| | $H_2O$ | 37.1 | lbs. |
| Solution 2: | | | |
| | Sodium aluminate | 1.42 | lbs. |
| | $H_2O$ | 14.7 | lbs. |
| Solution 3: | | | |
| | Tetramethylammonium chloride | 2.66 | lbs. |
| | $H_2O$ | 2.66 | lbs. |

Solution 2 was added to Solution 3 and the resultant Solution (2+3) was added to Solution 1, the resultant Solution (1+2+3) being designated Solution B. Solution A was added into Solution B with rapid stirring, and the combined solutions were mixed for 20 minutes in a Lightning mixer. Solution A was added to Solution B over a period of 13 minutes. The resultant Solution (A+B) was heated at 215°–218°F. for 90 ½ hours, at which time the crystallized product was removed by filtering. During the heating of the solutions the liquid was covered with oil to keep vaporization down to a minimum. The so filtered crystals were washed with hot water. The product composition had the following mole ratios of oxides to alumina:

| | |
|---|---|
| Tetramethylammonium oxide | 0.230 |
| Sodium oxide | 0.808 |
| Alumina | 1.00 |
| $SiO_2$ | 6.86 |

The product was highly crystalline as determined by X-ray analysis. It sorbed 2.2 weight percent cyclohexane at 20°F. under 20 mm Hg and at up to 12.0 weight percent water at 20°F. under 12 mm Hg pressure.

It was base exchanged at about 180°F. by 4 contacts with an aqueous ammonium sulfate solution having a concentration between about 15 and 20 percent ammonium sulfate by weight. The exchanges took from between about ½ hour to several hours. The exchanged ZSM-4 composition had a sodium content of about 0.43 weight percent such that the final product had a mole ratio of $Na_2O/Al_2O_3$ of 0.047. The exchanged product was filtered, washed and dried at 230°F. for 16 hours.

A portion of alpha alumina monohydrate was peptized by treating it with 10 weight percent acetic acid. It was blended with the exchanged ZSM-4 catalyst pre- Re₂O₃.

These catalysts were compared for polymerization activity with one another and with a standard amorphous $SiO_2$—$Al_2O_3$ cracking catalyst. Conversion of isobutene to oligomers, conversion of 1-butene to oligomers and conversion of propene and a refinery butane-butene stock are reported in Tables 9, 10, and 11 below:

Table 9

Weight Percent Conversion of Isobutene to Oligomers
300 LHSV - 60°C. - 150 psig.

| Catalyst | Time on Stream in Hours | | | | |
|---|---|---|---|---|---|
|  | ¼ | ½ | 1 | 2 | 3 |
| HZSM-4 |  |  | 76.9 | 74.6 | 77.0 |
| HY | 86.2 | 82.0 | 66.6 | 13.3 | 5.6 |
| REX | 17.3 | — | 4.7 | 2.4# |  |
| $SiO_2/Al_2O_3$** | 11.5 | 11.3 | 3.8 | 3.1* | 2.6 |

1½ Hours
*Run at 37.5 LHSV
**90% by weight, silica, 10% by weight alumina, surface area 235 square meters per gram, 46 AI.

Table 10

Weight Percent Conversion of 1-Butene to Oligomers
6.25 IHSV - 120°C. - 360 psig.

| Catalyst | Time on Stream in Hours | | | | | |
|---|---|---|---|---|---|---|
|  | 1 | 2 | 3½ | 5 | 6½ | 7½ |
| HZSM-4 | 33.1 | 29.3 | 28.5 | 28.5 | 26.9 | 25.8 |
| HY | 15.5 | 5.5 | 2.7 | 2.2 | — | — |

Table 11

Weight Percent Conversion of Olefins to Oligomers
Catalyst - HZSM-4 IHSV - 6.26 PSIG. - 740

| | Temperature, °C. | | |
|---|---|---|---|
| Charge | 105 | 155 | 190 |
| Propene | 44.7 | 61.0 | 90.8 |
| Butane-butene stock | 37.1* | 50.2* | 57.4* |

*Weight percent of the olefins converted that were in the refinery butane-butene stock, which had the following composition:

| Propene | 1.2 Wt. % | |
| 1-Butene | 10.8 | |
| Isobutene | 11.7 | 41.6 Wt. % olefins |
| Trans-2-butene | 10.8 | |
| Cis-2-butene | 7.1 | |
| Propane | 3.4 | |
| Isobutane | 33.1 | |
| n-Butane | 21.9 | |

From the results, particularly those shown in Tables 9 and 10, it is apparent that the ZSM-4 catalyst retains its activity over a long period of time. Compare, for instance, HZSM-4 with either HY catalyst. While the HY catalyst has activity, this activity rapidly diminishes whereas the activity of the ZSM-4 catalyst remains substantially constant. This is so for either 1-butene polymerization or for isobutene polymerization. Note that after 5 hours a HY catalyst converts less than 10 percent that converted by a HZSM-4 catalyst during 1-butene polymerization. As seen in Table 11, the catalyst of this invention is useful also in propene polymerization and polymerization of refinery stream containing both alkanes and olefins.

EXAMPLES 20 AND 21

Two samples of ZSM-4 catalyst were prepared, one of which had a silica:alumina mole ratio of 7.7:1, the other had a silica:alumina mole ratio of 13:1. The ability of these catalysts to dealkylate nonyl naphthalene was demonstrated by charging them separately into a reactor maintained at 550°F. (290°C.) for several hours. The yield of naphthalene per gram of catalyst at various reaction times is set forth in Table 12 below, wherein these catalysts are compared with REY, REX and hydrogen mordenite for their respective abilities to catalyze dealkylation of nonyl naphthalene.

Table 12

Dealkylation of Nonyl Naphthalene at 550°F. (290°C.)
Conversion in gram product per gram catalyst

| Catalyst | Reaction Time | | | |
|---|---|---|---|---|
|  | 1 | 2 | 3 | 5 Hours |
| HZSM-4 7.7:1 silica:alumina | 24 | 43 | 54 | 63 |
| HZSM-4 13:1 silica:alumina | 22 | 34 | 41 | 51 |
| REY | 19 | 24 | 26 | 29 |
| REX | — | 9 | — | — |
| Hydrogen Mordenite | 0.5 | — | — | — |

Accordingly, it is seen from Table 12, ZSM-4 provides substantially better yields of dealkylated product versus the other zeolites employed and continues its good conversion up to and including 5 hours reaction time.

From the foregoing disclosure, it is apparent that the family of ZSM-4 catalysts is a new and unique crystalline zeolite family having properties substantially different from many known zeolites also exhibiting catalytic behavior. ZSM-4 unexpectedly has superior catalytic properties for isomerization and other petroleum processes for which none of the known zeolites are as well suited. It should be apparent that the ZSM-4 catalyst disclosed above can be modified in various ways as by base exchange, calcination, steam treatment and thermal treatment. In their sodium form, members of the family of ZSM-4 are useful as adsorbents for gases and liquids such as water and cyclohexane.

The terms and expressions used herein have been used as terms of description and not of limitation, as there is no intention, in the use of such terms and expressions of excluding any equivalents, or portions thereof, as various modifications and departures will become apparent to one skilled in the art from the foregoing description.

I claim:

1. A process for converting a hydrocarbon charge which comprises contacting the same under hydrocarbon conversion conditions with a crystalline aluminosilicate zeolite catalyst having the X-ray powder diffraction pattern of Table 1 of the specification and having a composition in terms of mole ratios of oxides as follows:

$$0.9 \pm 0.2 \; M_{2/n}O : Al_2O_3 : 3\text{--}20 \; SiO_2 : zH_2O$$

wherein M is a cation selected from the group consisting of alkylammonium, arylammonium, metals, ammonium and hydrogen, $n$ is the valence of said cation and $z$ is from 0 to 20, the hydrocarbon conversion conditions selected from those comprising a temperature of from 400°F to 1,100°F, a pressure of from 10 psig to 2,500 psig, and a liquid hourly space velocity of from 0.1 to 50.

2. A process in accordance with claim 1 which comprises contacting the hydrocarbon charge under said hydrocarbon conversion conditions with a catalyst comprising a zeolite, as defined in said claim 1, that has been activated by heating from at least 700°F to about 1,600°F.

3. A process in accordance with claim 1 which comprises contacting the hydrocarbon charge under said hydrocarbon conversion conditions with the crystalline From the data above, it is apparent that the ZSM-4 catalyst shows better activity in requiring less temperature (606°F.) to sustain the conversion level given above than required by the Pt-REX catalyst. Based upon several runs extrapolated results of hydrocracking a stock containing 35 ppm nitrogen at 2,000 psig., single pass, 0.5 liquid hourly space velocity and about 20,000 standard cubic feet hydrogen per barrel of charge with the catalysts designated below were determined. Each catalyst was impregnated with about 2.5 weight percent platinum. The estimate results at the 90 percent conversion level for these catalysts is set forth in Table 7 below.

Table 7

| Aluminosilicate | Conversion REX | REY | Acid Y | Acid ZSM-4 |
|---|---|---|---|---|
| Dry Gas Weight | 2.0 | 1.5 | 2.3 | 2.8 |
| C₄ Volume | 16 | 13.5 | 16.5 | 19 |
|  | 30.5 | 25 | 30 | 34 |
| C₅–180 Volume |  |  |  |  |
| 180–380 Volume | 68 | 76 | 71 | 64 |
| C₅⁺ Volume | 108.5 | 111 | 111 | 108 |
| Temperature at 48 Hrs. | 640 | 605 | 595 | 630 |
| 650°F.⁺ Wt. % of |  |  |  |  |
| 380°F.⁺ Fraction | 8 | 24 | 5 | 15 |
| Isobutane % of C₄ | 74 | 79 | 76 | 84 |
| Isopentanes % of C₅ | 76 | 79 | 77 | 89 |
| Paraffins, Volume % | 43 | 44 | 44 | 34 |

REX - rare earth exchanged zeolite X.
REY - rare earth exchanged zeolite Y.
Acid Y - zeolite Y exchanged into hydrogen form.

Samples of lanthanum exchanged ZSM-4 catalyst were prepared by giving 500 grams of dried ZSM-4 four 1-hour 210°F. exchanges with a 5 percent $LaCl_3$ solution. This product was washed and dried. Its sodium content was 1.2 percent by weight and its ignition loss at 1,100°C. was 11.5 weight percent. After calcining 1 hour at 1,100°F. its water adsorption was 11.8 percent and its cyclohexane adsorption was 1.1 percent under the conditions of test reported above. Its surface area was 279 square meters per gram.

Ammonium exchanged ZSM-4 was prepared by giving 300 grams dried ZSM-4 powder four 1-hour 210°F. exchanges with 20 weight percent $(NH_4)_2SO_4$ solution. The product was water washed and dried at 120°C. The product had a sodium content of 0.31 weight percent and an ignition loss of 10.5 percent. After calcining in its own atmosphere up to and at 1,000°F. for 3 hours, it had a water adsorption capacity of about 12.1 grams per 100 grams catalyst and a cyclohexane adsorption capacity of 3.9 grams per 100 grams catalyst. Its surface area was 323 square meters per gram.

The catalysts were blended with Georgia kaolin clay to form a cracking catalyst. The product was wetted, extruded and cut into ¼ × ¼ inch pieces. The pieces were dried at 120°C. then calcined 3 hours at 1,000°F. in air. However, in the case of the catalyst containing $NH_4$—ZSM-4, this calcination was preceded by heating up and calcining 3 hours in its own atmosphere (covered crucible). The gas oil cracking results and catalysts tested are shown in Table 8.

Table 8

Cracking Characteristics of la-ZSM-4 and H-ZSM-4 With Georgia Kaolin Binder

| No. | Identification | 3 Hr. 1000°F. 3 Volume Air 1 Volume Cot. | Steamed 24 hr. 1200°F. 15 psig. | Density Hand Tapped (g/cc) | Sodium Level in Zeolite (Wt. %) | Conv., Vol. % | C₄ Free Gasoline Volume % | Coke, Wt. % |
|---|---|---|---|---|---|---|---|---|
| 1 | la-ZSM-4 5 Wt. % | X |  | .923 | 1.2 | 12.9 | 10.5 | 2.1 |
| 2 | la-ZSM-4 15 Wt. % | X |  | .865 | 1.2 | 15.5 | 12.2 | 2.6 |
| 3 | la-ZSM-4 30 Wt. % | X |  | .831 | 1.2 | 22.8 | 18.7 | 2.5 |
| 4 | la-ZSM-4 5 Wt. % |  | X | .955 | 1.2 | 11.8 | 11.2 | 1.3 |
| 5 | la-ZSM-4 15 Wt. % |  | X | .900 | 1.2 | 10.7 | 10.0 | 1.4 |
| 6 | la-ZSM-4 30 Wt. % |  | X | .877 | 1.2 | 13.2 | 12.9 | 1.2 |
| 7 | $NH_4$-ZSM-4 5 Wt. % | X |  | .918 | 0.31 | 19.2 | 16.4 | 1.8 |
| 8 | $NH_4$-ZSM-4 15 Wt. % | X |  | .905 | 0.31 | 30.4 | 22.4 | 2.7 |
| 9 | $NH_4$-ZSM-4 30 Wt. % | X |  | .828 | 0.31 | 43.2 | 31.6 | 3.7 |
| 10 | $NH_4$-ZSM-4 5 Wt. % |  | X | .941 | 0.31 | 13.9 | 13.5 | 1.2 |
| 11 | $NH_4$-ZSM-4 15 Wt. % |  | X | .920 | 0.31 | 18.0 | 17.1 | 1.2 |
| 12 | $NH_4$-ZSM-4 30 Wt. % |  | X | .850 | 0.31 | 22.3 | 20.4 | 1.4 |

The sample ZSM-4 catalyst was prepared and converted into thee active form by heating the $NH_4$-form for 2 hours at 1,100°F. Before use, it was heated at 1,000°F. for 2 hours in air and for 1 hour in a stream of hydrogen. Particle size was 20-40 mesh. Chemical analysis of $NH_4$-ZSM-4, before calcining:

|  | Weight Percent |  |
|---|---|---|
| Sodium | 0.31 |  |
| $SiO_2$ | 86.5 |  |
| $Al_2O_3$ | 12.1 |  |
| N ($NH_3$) | 2.06 |  |
| Ash | 86.4 |  |
| Physical Properties: |  |  |
| $H_2O$ adsorption | 12.1 | percent |
| Cyclohexane adsorption | 3.9 | percent |
| Surface Area | 323 | m²/g |

An HY catalyst was prepared by calcining $NH_4Y$. HY', an active and stable form of Y was prepared from $NH_4Y$. The $NH_4Y$ was steam calcined at 1,000°F. for 90 minutes and then exchanged with $NH_4Cl$ for 18 hours. After filtering, water washing and drying at 105°C. the catalyst was treated with $(NH_4)_2H_2$ ethylenediamine tetraacetate of solution having a pH 7 for 90 minutes of a reflux temperature. This treatment removes 30–45 percent of the aluminum.

A rare earth exchanged zeolite X catalyst was prepared by known procedure and contained 27.5 percent

UNITED STATES PATENT AND TRADEMARK OFFICE
CERTIFICATE OF CORRECTION

PATENT NO. : 3,923,639
DATED : December 2, 1975
INVENTOR(S) : Julius Ciric

It is certified that error appears in the above-identified patent and that said Letters Patent are hereby corrected as shown below:

```
Column  4, line 40, "various" should be --Various--.
Column  5, line 66, "the" should be --The--.
Column  6, line 55, "selectivity factor" should be --"selectivity factor"--
Column  7, line 30, "reactions" should be --reactors--.
Column  7, line 59, "comlpex" should be --complex--.
Column  7, line 65, "aformentioned" should be --aforementioned--.
Column  9, line 47, "commercially" should be --oxide--.
Column 10, line 43, "member" should be --number--.
Column 11, line  6, "whch" should be --which--.
Column 12, line  8, "salts" should be --include--.
Column 12, line 23, "salte" should be --salts--.
Column 14, line 27, "calcium" should be --calcine--.
Column 14, line 48, "4" should be --5--.
Column 15, line 61, "ration" should be --ratio--.
Column 17, line 31, "hours" should be --hour--.
Column 19, Example 6, under Solution F. delete the second appearance
                      of the word "water" in the column.
Column 20, line 14, "to a" should be --to be a--.
Column 21, line 59, "be a" should be --a--.
Column 23, line 65, "overn" should be --oven--.
Column 25, Table 8, third column heading, "1 Volume Cot." should be
                    --1 Volume Cat.--.
Column 25, Table 8, fourth column heading, "15 psig" should be
                    --15# psig--.
Column 26, line 66, "of" should be --at--.
Column 27, line 17, "#1 1/2 Hours" should be --#1-1/2 Hours--.
```

Signed and Sealed this

Thirteenth Day of July 1976

[SEAL]

Attest:

RUTH C. MASON
*Attesting Officer*

C. MARSHALL DANN
*Commissioner of Patents and Trademarks*